March 13, 1956 K. R. JOHNSON 2,738,187
INDEXING MECHANISM WITH FRICTION DRIVE
Filed Dec. 12, 1951 3 Sheets-Sheet 1

INVENTOR
Kenneth R. Johnson
By Carlson, Pitzner, Hubbard & Wolfe
ATTORNEYS

March 13, 1956     K. R. JOHNSON     2,738,187
INDEXING MECHANISM WITH FRICTION DRIVE
Filed Dec. 12, 1951     3 Sheets-Sheet 2
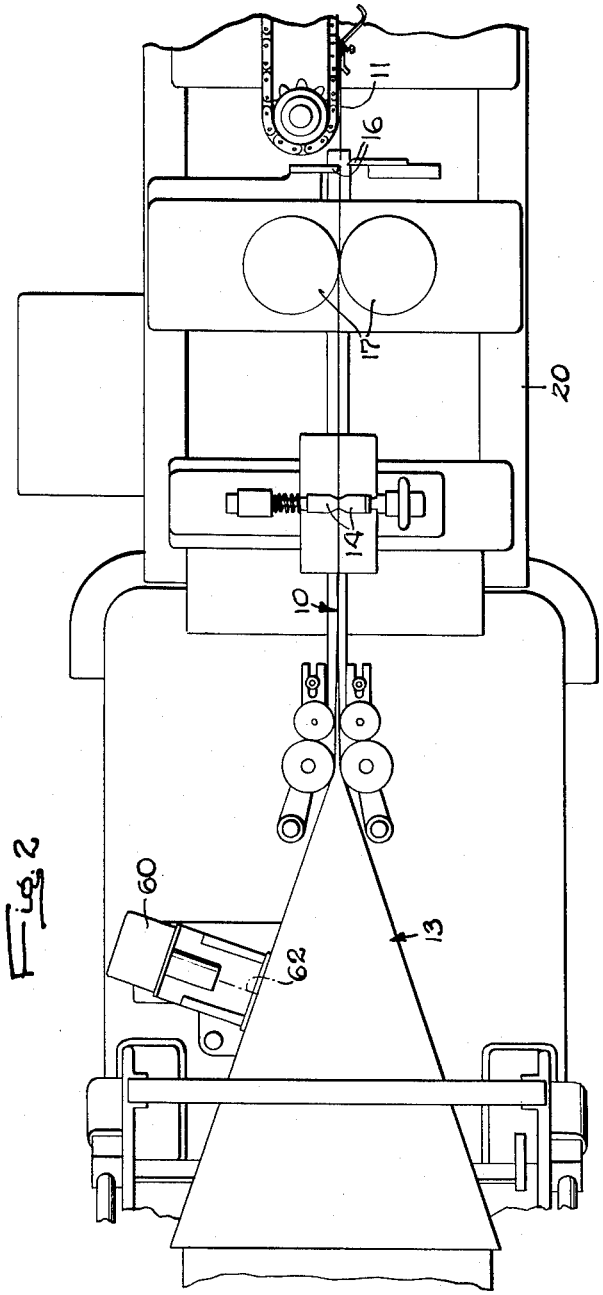
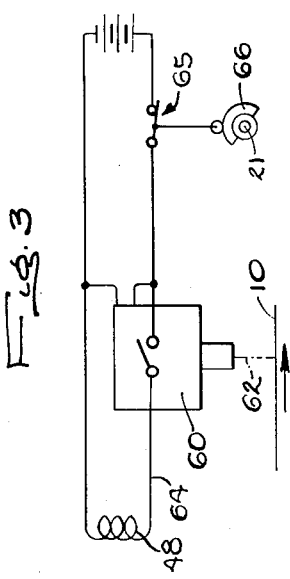
INVENTOR
Kenneth R. Johnson
By *(signature)*
ATTORNEY

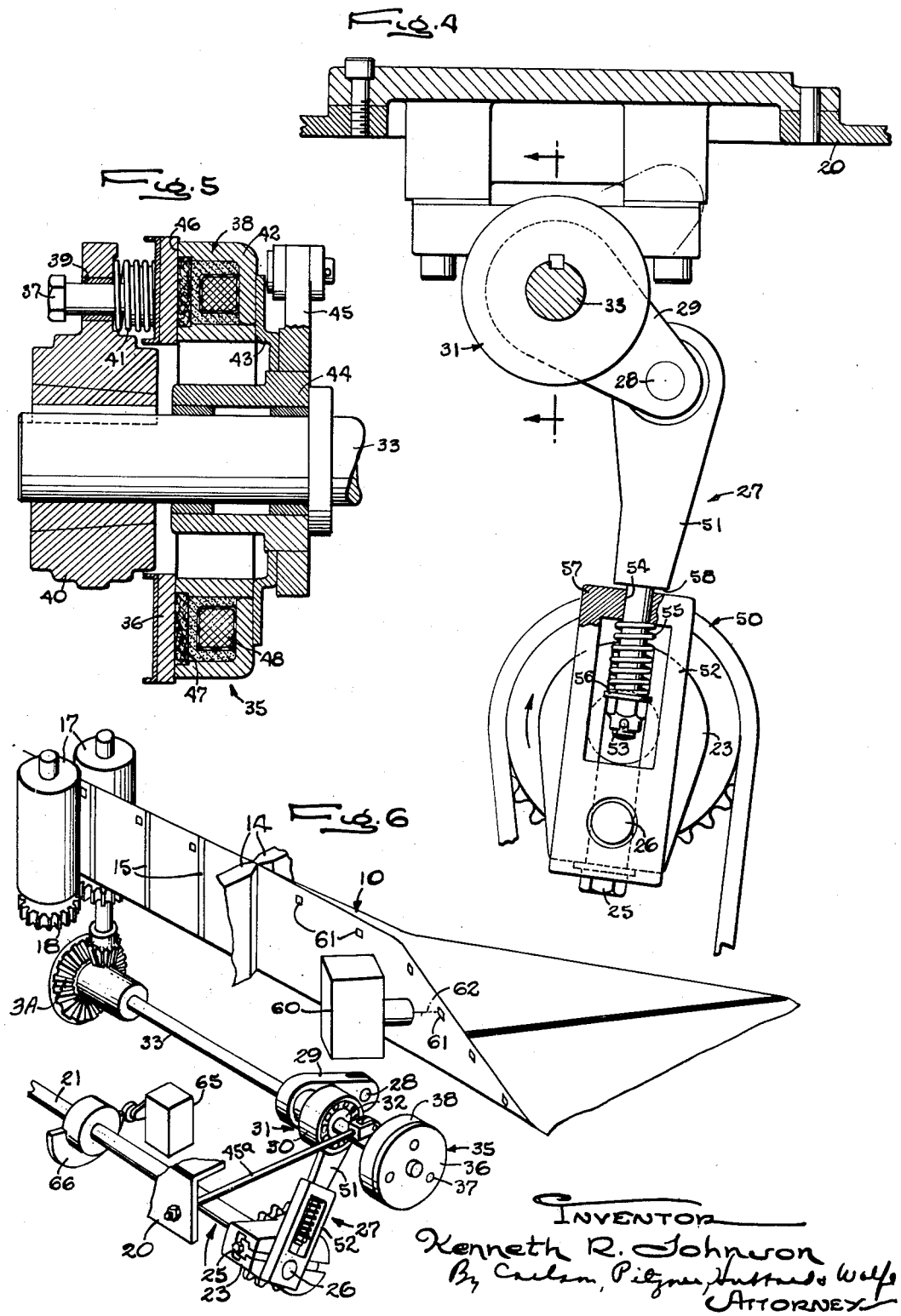

United States Patent Office 2,738,187
Patented Mar. 13, 1956

2,738,187

INDEXING MECHANISM WITH FRICTION DRIVE

Kenneth R. Johnson, Rockford, Ill., assignor to Bartelt Engineering Company, Rockford, Ill., a corporation of Illinois Application December 12, 1951, Serial No. 261,226

3 Claims. (Cl. 271—2.6)

This invention relates to a power driven mechanism for applying friction to a part or workpiece to advance the same successively along a predetermined path in steps of equal length.

One object is to provide a friction drive of the above character which insures uniformity in the length of the steps of advance of the part even in spite of slippage in the drive.

Another object is to transmit the motion of a power driven element to the friction driver through a yieldable device and to arrest the motion of the part in a novel manner after a predetermined advance thereafter.

A further object is to terminate the advance of the friction driver by a brake controlled in a novel manner in response to actual movement of the part.

Other objects and advantages of the invention will become apparent from the following detailed description taken in connection with the accompanying drawings, in which Figure 1 is a fragmentary elevational view of an indexing mechanism embodying the novel features of the present invention.

Fig. 2 is a fragmentary plan view.

Fig. 3 is a circuit diagram.

Fig. 4 is a fragmentary sectional view taken along the line 4—4 of Fig. 1.

Fig. 5 is a diametrical sectional view taken in the plane 5—5 of Fig. 4 and showing the friction brake.

Fig. 6 is a fragmentary perspective view of the principal operating parts.

Figure 1:
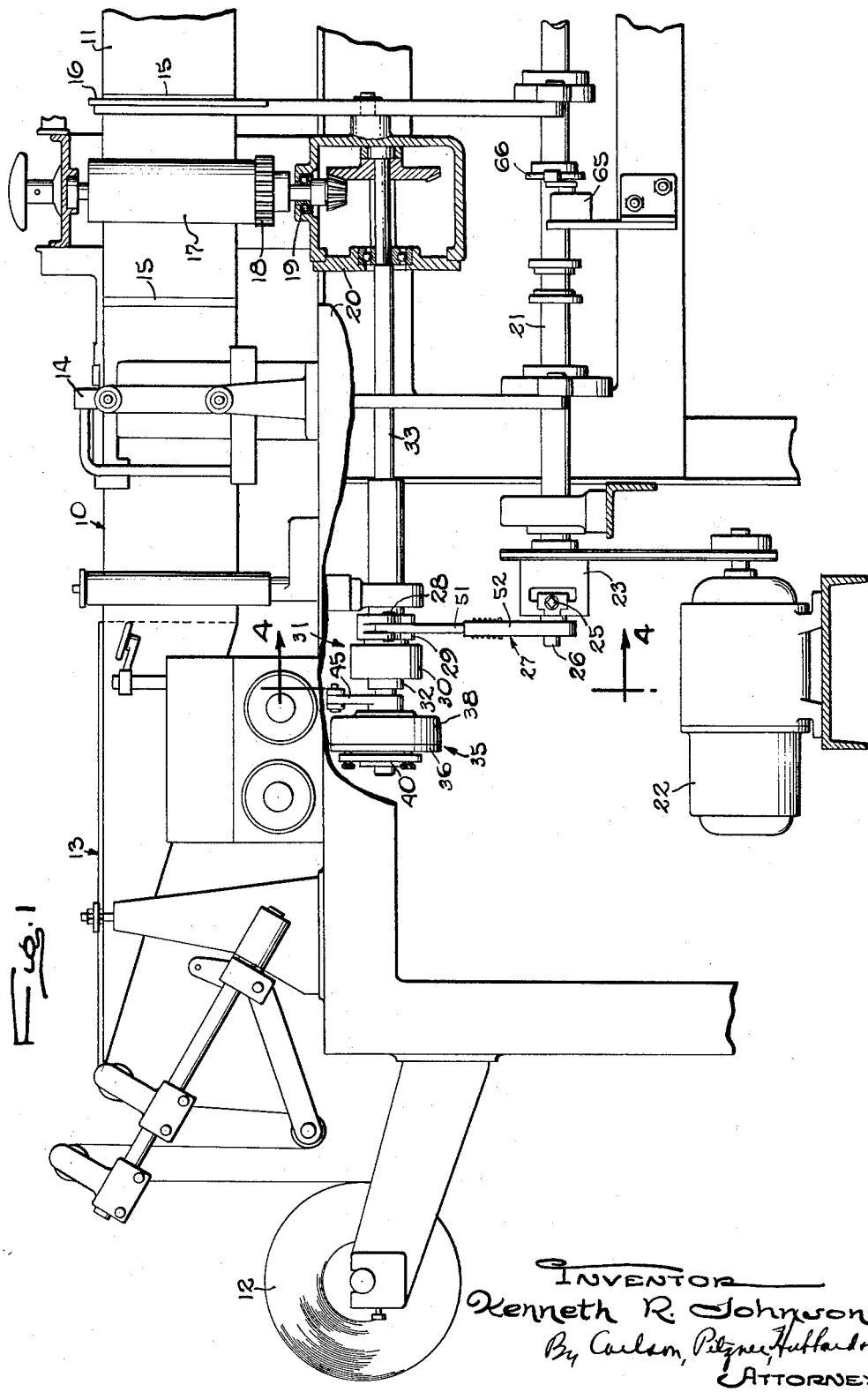

While the invention may be utilized to move a variety of different kinds of objects, it is shown in the drawings, for purposes of illustration, incorporated in a machine for converting a strip 10 of flexible material into a series of envelopes 11 as the strip is advanced step by step in an endwise direction. The strip, which is composed of or coated with a thermosensitive or heat sealable material is led off from a supply roll 12, folded along its longitudinal center line as it passes a folder 13, is heat sealed crosswise by heat and pressure applied by shoes 14, and the cross seals 15 are cut by a knife 16 at a subsequent station to separate the envelopes 11.

The folded strip is pulled forwardly through the folder and heat sealer and pushed on past the cutter 16 by rollers 17 bearing frictionally against opposite sides of the folded strip 10 and rotatable about parallel axes extending crosswise of the strip. To increase the friction, the roller surfaces are preferably formed of yieldable material such as rubber and are pressed tightly together. The roller shafts are connected by gears 18 and journaled in bearings 19 on a frame 20 which also supports a main drive shaft 21. A motor 22 drives the shaft 21 continuously at a speed corresponding to the desired frequency of the indexing of the strip 10. To enable the length of the indexing movements of the strip 10 to be adjusted easily, the rotary motion of the shaft 21 is converted into reciprocatory motion by a crank 23 carrying a pin 26 which, by adjusting a screw 25, may be adjusted radially to vary the throw of the crank. The latter is pivotally connected to one end of a link 27 which in turn is pivoted at 28 to the free end of a crank 29 fast on the outer or driving member 30 of a one-way or so-called Sprag clutch 31. The inner or driven member 32 of the clutch is fast on a shaft 33 coupled to the roller gears 18 through bevel gearing 34.

With the foregoing arrangement, it will be observed that during one half of each revolution of the shaft 21, the shaft 33 and therefore the rollers 17 will be advanced through a distance corresponding to the adjusted throw of the crank 23, the clutch 31 being released during the remaining part of the drive shaft revolution during which the shaft 33 remains stationary. In the present instance, the clutch is so arranged that the idle stroke of the connecting rod 27 occurs in the half revolution of clockwise rotation of the crank 23 from the dead center position shown in Fig. 4.

In accordance with the present invention, provision is made for arresting the motion of the feed rollers 17 after the strip 10 has been advanced the desired distance while at the same time permitting some overtravel of the drive shaft 21. Preferably, such stopping of the drive rollers is effected by energizing a friction brake 35 which acts on a part directly coupled to the rollers 17, this part being the shaft 33 in this instance.

The brake shown in Fig. 5 is controlled electromagnetically and comprises an armature ring 36 rotatable with the shaft 33 and adapted for axial gripping engagement with the face of a nonrotatable magnet 38. Herein, angularly spaced pins 37 project from the back of the armature ring and slide in bearings 39 in a collar 40 keyed to the shaft 33. Light springs 41 hold the armature in close proximity at all times to the face of the magnet 38. As shown, the latter comprises an annular core 42 of U-shaped radial cross section supported through a bracket 43 by a sleeve 44 journaled on the shaft 33. Through a rod 45ᵃ (Figs. 5 and 6) connecting the machine frame 20 and an arm 45 on the magnet, the latter is held against turning.

The pole faces 46 of the magnet core are spanned by the armature which is drawn into gripping engagement with the pole faces and a nonmagnetic wear ring 47 by the flux which threads the core and armature upon energization of a winding 48 disposed within the core. Thus, the brake is applied and released by energizing and deenergizing the winding 48.

While the yieldable device above referred to may be located in different parts of the drive connection and may take various forms including a spring engaged slip clutch, it is shown in the drawings as comprising a yieldable connection 50 between opposite end portions 51 and 52 of the connecting rod 27. This connection comprises a rod 53 slidable endwise in a guide 54 on the inner end of the part 52 which is recessed to receive a coiled spring 55 acting in compression between an adjustable abutment 56 on the rod 53 and a crosspiece 57 on the inner end of the connecting rod part 52. The spring 55 tends to collapse the connecting rod 27 until the crosspiece 57 encounters an abutment 58 on the part 51 as shown in Fig. 4. The rod is however extensible so that when the motion of the part 51 is arrested by the application of the brake 35 before the crank 23 reaches the dead center position shown in Fig. 4, the connecting rod part 52 may separate from the part 51 and thus continue to move with the crank during the remainder of the half revolution of the latter to the dead center position.

The actual movement of the strip 10 is measured by a suitable feeler 60 which controls the energization of the winding to apply the brake 35. Herein, the feeler is of the photoelectric type and is arranged to coact with register marks 61 printed along one edge of the strip 10 and spaced apart to correspond to the lengths of the steps of advance of the strip. A so-called photoelectric scanner No. CR7515P203 sold by General Electric Company may be employed and mounted on the machine frame 20 in a position to direct its light beam 62 against the strip 10 along the path traversed by the marks 61. The arrangement is such that when the light beam is directed against a light area of the strip 10 between the marks 61, the feeler will interrupt the flow of current to the winding 48 and the brake 35 will remain released. However, when one of the marks 61 passes into alinement with and intercepts the light beam, a circuit 64 (Fig. 3) is completed energizing the brake 35 thus abruptly arresting the motion of the feed rolls 17 and the strip 10.

Means is provided for disabling the feeler 60 and releasing the brake 35 before the start of the next active stroke of the connecting rod 27. While this means may take various forms, it is shown herein as comprising a switch 65 controlling the energization of the brake and adapted to be operated by a cam 66 on the shaft 21. The cam is shaped to open the switch during the idle or return stroke of the connecting rod 27 and allow the switch to close after the initiation of the next advance of the strip 10 but before the next register mark reaches the light beam 62. In this way, the brake is released to permit starting of the feed rollers in the proper position of the cycle control shaft 33 even though at this time the light beam is intercepted by one of the register marks.

Preparatory to operating the feed mechanism above described, the throw of the crank 23 is adjusted through the screw 25 to produce a peripheral movement of the rollers 17 somewhat greater than the width of the envelope 11 to be formed. As the shaft 21 rotates, the connecting rod 27 is reciprocated back and forth and the one way clutch 31 transmits the return motion to the shaft 33 thus turning the rollers 17 to advance the strip.

At the end of one advance of the strip and completion of the shaft revolution, the crank 23 will be on dead center as shown in Fig. 4, the light beam 62 will be intercepted by one mark 61 as shown in Fig. 6, the brake 35 will be applied, and the connecting rod 27 will be extended as shown in Fig. 4.

As the shaft continues to turn clockwise, the crank end of the connecting rod is allowed to move inwardly under the action of the spring 55 until the abutment 58 is encountered, the rod being thereafter held collapsed by the spring. The clutch 31 slips in this half revolution and no motion is imparted to the feed rolls 17. Before completion of the forward or idle stroke of the connecting rod, the cam 66 opens the switch 65 thus disabling the feeler 60 and releasing the brake 35.

In the remaining half revolution of the shaft 21 during which the connecting rod 27 is drawn downwardly as viewed in Fig. 4, the clutch 31 picks up the shaft 33 to turn the rolls 17 and advance the strip 10. The switch 65 is allowed to close after the previously used mark 61 has passed out of the light beam 62 so that the feeler 60 is then conditioned to signal the completion of the required advance of the strip. Thus, when the next mark reaches the beam 62, the feeler operates to complete the circuit 64 for energizing the brake 35 thus quickly stopping the feed rolls 17 with the leading cross-seal 15 on the strip properly centered in relation to the cutter 16. Such stopping of the shaft 33 occurs before completion of the full revolution of the crank 23 which, after application of the brake overtravels the clutch 31 by yielding of the connecting rod connection 50 as shown in Fig. 4.

It will be apparent from the foregoing that in spite of slippage between the rolls 17 and the strip 10 or variations in the point at which the clutch 31 picks up the shaft 33, the strip will always be advanced through a fixed distance predetermined by the spacing of the register marks 61.

I claim as my invention:

1. In a mechanism for indexing a part successively through steps of equal length, the combination of, a rotatable member frictionally engaging said part and rotatable unidirectionally to advance the part, a brake adapted when energized to arrest the motion of said member and hold the latter against turning, a continuously rotating actuating member, a drive element movable back and forth through a predetermined range and driven by said actuating member, a feeler operatively associated with said part and operable to signal the advance of the latter through one of said steps, a motion-transmitting connection between said drive element and said rotatable member including a one-way clutch for advancing said member during the active stroke of said element, means interposed in the connection between said element and said rotatable member and yieldable to permit continued movement of said element throughout the remainder of said range after application of said brake, means for energizing said brake when said feeler signals the advance of said part through one of said steps, mechanism operable when activated to maintain said brake released irrespective of said feeler, and a timing device operated by said actuating member and operable to activate said mechanism during the initial part of each active stroke of said drive element.

2. In a machine for converting strip material, the combination of, a member frictionally engaging the strip and rotatable unidirectionally to advance the strip along a predetermined path, a brake operable when energized to arrest the motion of said member and hold the latter against turning, a continuously rotating shaft, a drive element movable back and forth through a predetermined range and driven by said shaft, a feeler operatively associated with said strip and operable to signal the advance of the latter through a step of predetermined length, a motion-transmitting connection between said element and said member including a one-way clutch for advancing the member during the active stroke of said element, means interposed in said connection and yieldable to permit continued movement of said element through the remainder of said range after application of said brake, means for energizing said brake when said feeler signals the advance of said strip through said step, mechanism operable when activated to maintain said brake released irrespective of said feeler, a timing device operated by said shaft and operable to activate said mechanism during the initial part of each active stroke of said drive element, and a strip converting unit disposed along said path and responsive to said shaft to engage said strip during dwelling of the latter and while said brake is energized.

3. In a mechanism for advancing a part step by step along a path, the combination of, a member frictionally engaging said part and movable to advance the part along said path, a continuously rotating shaft, a drive element movable back and forth through a predetermined range and eccentrically connected to said shaft to be driven by the same, a connection transmitting one stroke of said element to said member and comprising a one-way coupling, a brake operable when energized to arrest the motion of said member and hold the latter against turning, a feeler responsive to the actual advance of said part and operable after the part has been advanced a step of predetermined length during the active stroke of said element to energize said brake, means for selectively varying the range of said drive element to cause said feeler to be actuated immediately prior to the completion of the active stroke of said element, and means interposed in the connection between said element and said member and yieldable to permit continued movement of the element through the remainder of said range after energization of said brake.

References Cited in the file of this patent

UNITED STATES PATENTS

| | | |
|---|---|---|
| 1,873,057 | Smith | Aug. 23, 1932 |
| 1,988,486 | Ferenci | Jan. 22, 1935 |
| 2,029,919 | Fuller | Feb. 4, 1936 |
| 2,314,411 | Lyon | Mar. 23, 1943 |
| 2,648,183 | Dalton | Aug. 11, 1953 |

FOREIGN PATENTS

| | | |
|---|---|---|
| 177,321 | Great Britain | Mar. 30, 1922 |